United States Patent

Mesnage et al.

[11] Patent Number: 5,903,122
[45] Date of Patent: May 11, 1999

[54] ELECTRIC COMMAND DEVICE FOR CONTROLLING SEAT POSITIONING AND STORING DESIRED SEAT POSITIONS

[75] Inventors: Stéphane Mesnage, Flers; Yannick Leroy, Lisieux, both of France

[73] Assignee: Bertrand Faure Equipements SA, France

[21] Appl. No.: 08/802,632

[22] Filed: Feb. 19, 1997

[30] Foreign Application Priority Data

Feb. 21, 1996 [FR] France .................................. 96 02139

[51] Int. Cl.⁶ ....................................................... H02P 1/04
[52] U.S. Cl. ...................................... 318/469; 364/424.05
[58] Field of Search ................................... 318/280–286, 318/466–470, 434; 49/26, 29, 30, 139, 140; 297/327, 330; 364/424.05; 307/10.1

[56] References Cited

U.S. PATENT DOCUMENTS

| | | | |
|---|---|---|---|
| 4,451,887 | 5/1984 | Harada et al. | 364/424.059 |
| 4,477,874 | 10/1984 | Ikuta et al. | 364/424 |
| 4,497,518 | 2/1985 | Nishimura et al. | 297/341 |
| 4,728,873 | 3/1988 | Inoue et al. | 318/568.1 |
| 5,554,912 | 9/1996 | Thayer et al. | 315/157 |
| 5,712,625 | 1/1998 | Murphy | 318/568.1 |

Primary Examiner—Jonathan Wysocki
Attorney, Agent, or Firm—Larson & Taylor

[57] ABSTRACT

This is a command device for a vehicle seat, including electric motors connected to a common power supply, position sensors associated with these motors, an electronic central unit and a motor command keypad which includes power-on/power-off switches connected to the common power supply via a single relay. When the central unit receives the order to look for a seat position stored in memory, it monitors the actuation of the power-on/power-off switches and opens the relay when it detects such an actuation which would tend to move the seat away from said memorized position.

5 Claims, 2 Drawing Sheets

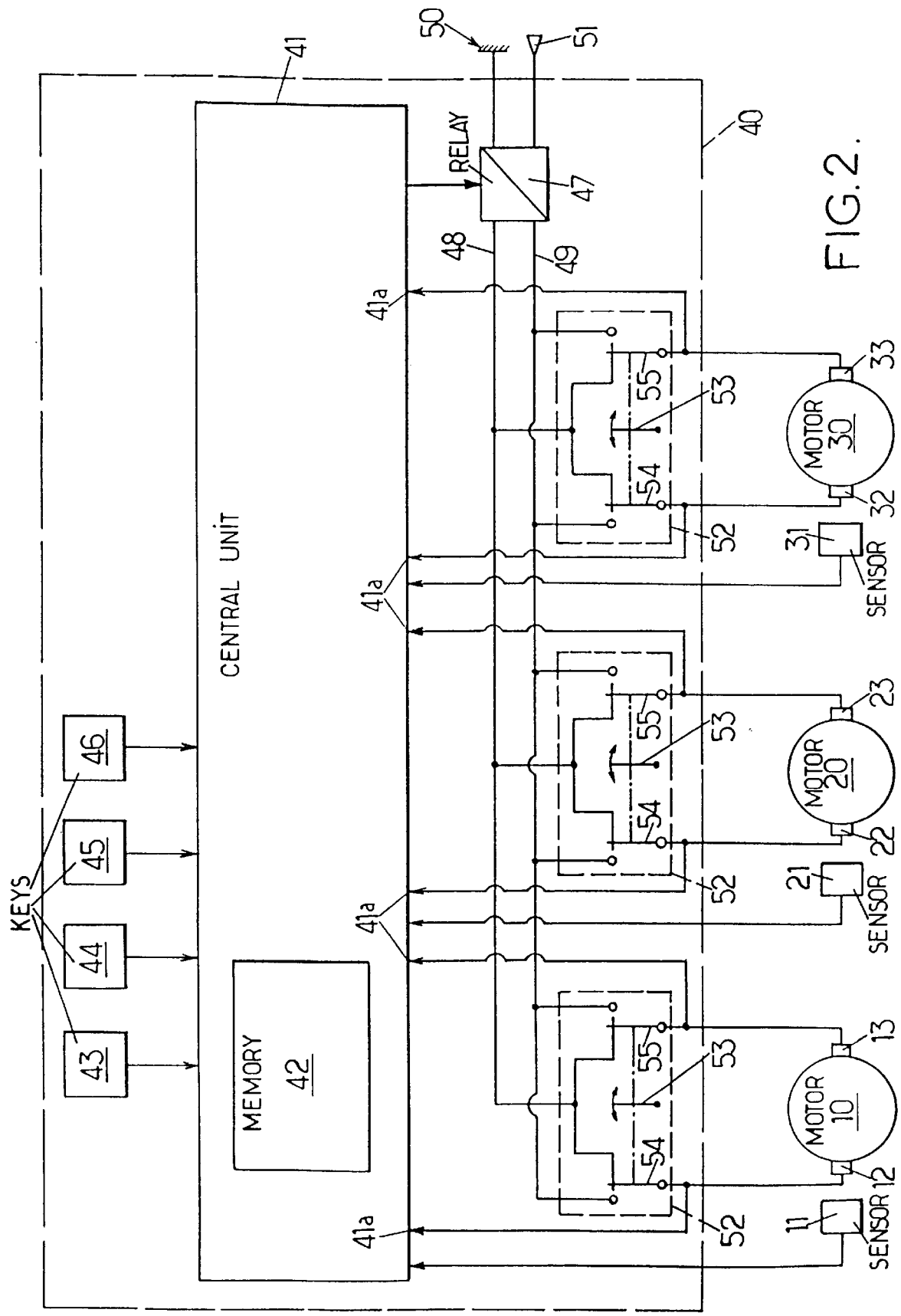

ELECTRIC COMMAND DEVICE FOR CONTROLLING SEAT POSITIONING AND STORING DESIRED SEAT POSITIONS

FIELD OF THE INVENTION

The present invention relates to electric command devices for vehicle, especially motor vehicle, seats.

More specifically, the invention is concerned with command devices intended to equip vehicle seats which have several moving parts, these devices including:

electric adjustment members connected to a common electrical power supply for commanding the adjustment of at least some of the moving parts of the seat, known as the motorized parts, position sensors associated respectively with these various motorized parts, an electronic central unit which receives information from the various position sensors and which controls the operation of the adjustment members, this central unit furthermore being designed to be able to store some seat positions in memory, an adjustment command keypad including actuating members which allow the adjustment members to be commanded in order selectively to displace the motorized parts of the seat in two opposite directions, and a memory command keypad for commanding the memory storage of one seat position by the central unit and for commanding the return of the seat to a position previously stored in memory.

BACKGROUND OF THE INVENTION

The adjustment command keypad is usually connected to the central unit which itself commands a set of electromagnetic relays providing the switching of the electric adjustment motors.

These command devices of the prior art have the following drawbacks:

at least n+1 electromagnetic relays are required to command the switching of a number n of electric adjustment motors, which means that these relays represent a high cost and substantial space requirement, and to command all of these relays with a high enough level of safety for the user of the seat, the central unit has to include substantial command programming, representing, for example, a memory size of approximately 10 ko.

OBJECTS AND SUMMARY OF THE INVENTION

The object of the present invention is especially to alleviate these drawbacks.

To this end, according to the invention, a device of the sort in question is essentially one in which each actuating member of the adjustment command keypad is a power-on/power-off-switch which makes it possible for one of the adjustment members to be powered or not powered selectively from the common electrical power supply, all the power-on/power-off switches being connected to this common power supply by means of a single switching device commanded by the central unit, command reading devices being provided, each for detecting an actuation of one of said on/off switches tending to displace a motorized part of the seat in a given direction, these command reading devices being connected to the central unit, and the central unit is designed to open the abovementioned switching device, thus preventing the seat from being displaced when it detects an actuation of one of the power-on/power off switches which would tend to move the seat away from a position stored in the memory if the memory command keypad has been actuated to look for this memorized position.

When the memory command keypad has been actuated to command the return of the seat to a position previously stored in memory, it is therefore the user who commands the displacement of the moving parts of the seat into this memorized position using the on/off switches, but the electronic central unit guides this user by allowing only those movements which bring the seat closer to the position stored in memory.

Thanks to these provisions, the device includes just one switching device for commanding all the electric adjustment motors, and this represents a substantial economy and substantial saving of space.

Furthermore, the command program included within the electronic central unit may be relatively small, in so far as it is intended to command just a single switching device, and especially as this command program need not include very rigorous safety functions because it no longer has the authority to command the motors.

Indeed, with the command device according to the invention, it is always the user who commands the movements of the moving parts of the seat, which means that operating safety essentially falls to this user.

In preferred embodiments, recourse is further had to one and/or other of the following provisions.

the command reading devices comprise voltage-detection devices connected downstream of the on/off switches, the central unit being designed to close the switching device again cyclically after each opening of this switching device in order thus to detect the actuation of the power-on/power-off switches, and this central unit also being designed to open this switching device in a time which is short enough to prevent any motorized displacement of the seat when it then detects an actuation of a power-on/power-off switch which would tend to move the seat away from the abovementioned position stored in memory if the memory command keypad has been actuated to look for this memorized position;

the central unit is designed to open the relay at most 1 ms after actuation of one of the power-on/power-off switches which would tend to move the seat away from a position stored in memory if the memory command keypad has been actuated to look for this memorized position;

the central unit is designed to close the switching device again after a duration of less than 10 ms after having opened this switching device;

the electric adjustment members are electric motors, each for driving at least one moving part of the seat.

BRIEF DESCRIPTION OF THE DRAWINGS

Other features and advantages of the invention will become clear in the course of the following description of one of its embodiments which is given by way of nonlimiting example with reference to the appended drawings.

In the drawings:

FIG. 2 is a block diagram of the command device of the seat of FIG. 1.

MORE DETAILED DESCRIPTION

Figure 1:
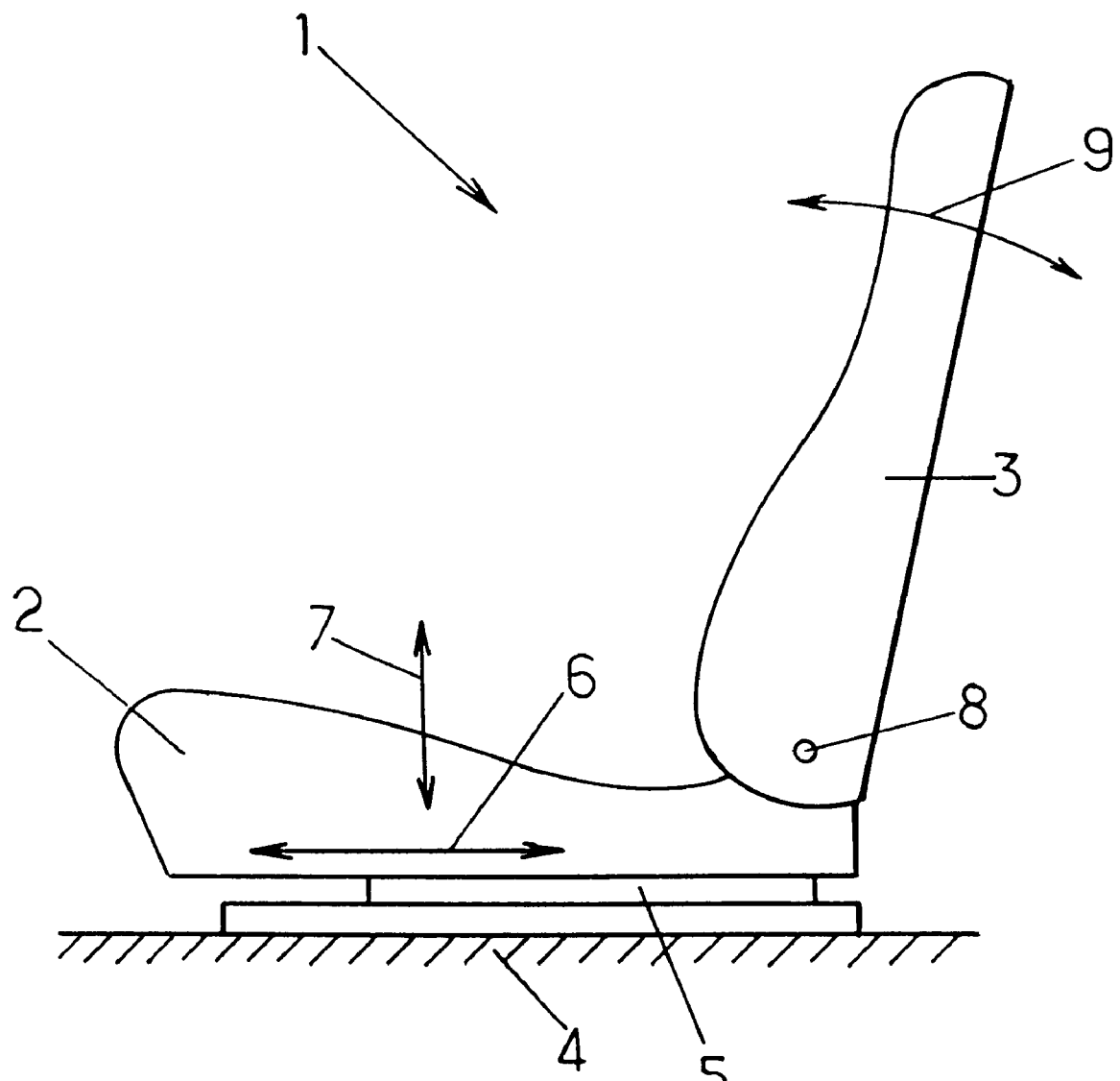
FIG. 1 is a diagrammatic view of a seat provided with a command device according to the invention.

FIG. 1 represents a motor vehicle front seat 1 which has a seat cushion 2 and a backrest 3.

The seat cushion 2 assembly is mounted on the floor 4 of the vehicle via slide rails 5, so that it can be displaced horizontally forward and backward, in the directions represented by the double-headed arrow 6.

This forward or backward sliding is commanded by a longitudinal-adjustment electric motor 10 (FIG. 2).

The seat cushion 2 is also adjustable heightwise by means of a raising mechanism (not represented) upward and downward in the directions represented by the double-headed arrow 7.

This adjustment is performed by means of an electric raising motor 20 (FIG. 2).

Furthermore, the backrest 3 assembly is mounted so that it can pivot on the seat cushion 2 about a transverse horizontal spindle 8, which means that this backrest 3 can pivot forward or backward in the directions represented by the double-headed arrow 9.

This adjustment is commanded by an inclination-adjustment electric motor 30 (FIG. 2).

It goes without saying that the invention is not limited to adjusting a seat as described hereinabove, but on the contrary encompasses the adjustment of any vehicle seat which may include more or fewer adjustable parameters than the seat hereinabove.

The adjustment of the various abovementioned moving parts of the seat is performed thanks to the command device represented in FIG. 2, which device could possibly also be used to command the adjustment of rear-view mirrors, the steering column, or other adjustable parts of the vehicle.

This command device comprises a command box 40, which may be fixed or may optionally be portable.

The command box 40 includes an electronic central unit 41 which may consist of a microprocessor or alternatively itself include a microprocessor.

This central unit 41 includes:
- a memory 42 capable of storing, in particular, three seat positions,
- inputs connected to memory-command keys 43, 44, 45, 46 (actuation of the key 43, followed by actuation of one of the keys 44, 45, 46, tells the central unit 41 that the current position of the seat is to be stored in a register of the memory 42 corresponding to this key 44, 45, 46, and actuation of one of the keys 44, 45, 46 not preceded by actuation of the key 43 tells the central unit that the user wishes to look for the position stored in the register of the memory 42 which corresponds to this key),
- inputs connected respectively to position sensors 11, 21, 31 which are associated with the electric adjustment motors 10, 20, 30 and which make it possible respectively to measure the longitudinal position of the seat cushion 2, the heightwise position of the seat cushion 2, and the inclination of the backrest 3,
- inputs 41a which are connected respectively to the various power supply terminals 12, 13, 22, 23, 32, 33 of the electric adjustment motors, so that the central unit 21 can recognize whether one of the electric adjustment motors is electrically powered, and with which polarity,
- and an output which commands an energy-switching device, such as a relay 47 or the like.

When this relay 47 is closed, it connects two power supply lines 48, 49 respectively to two terminals 50, 51 of a global DC electric power supply, the electric adjustment motors 10, 20, 30 for their part being connected up to the power supply lines 48, 49 downstream of the relay 47.

It is possible that the relay 47 could just be connected between the power supply line 49 and the terminal 51, the power supply line 48 then remaining permanently connected to the terminal 50.

In the example represented in FIG. 2, the terminal 50 of the global electric power supply corresponds to the negative pole of the vehicle battery and this terminal 50 is generally connected to the vehicle ground, while the terminal 51 corresponds to the positive pole of the vehicle battery.

Each of the electric adjustment motors 10, 20, 30 is connected to the power supply lines 48, 49 via a double power-on/power-off switch 52.

These power-on/power-off switches 52 are each commanded by a single three-position push button 53 which is mechanically connected to two switches 54, 55.

The push-button 53 can be displaced between a position of rest, an "on-forward" and an "on-backward" position, this push-button being urged elastically toward its position of rest.

When the push-button 53 is in the position of rest, the two switches 54, 55 connect the two terminals of the corresponding electric adjustment motor to the power supply line 48 which is itself connected to ground 50.

When the on/off switch 53 is in the "on-forward" position, the switches 54, 55 connect one of the terminals of the corresponding electric adjustment motor, known as the first terminal, to the power supply line 48 and the other terminal of this motor, known as the second terminal, to the power supply line 49.

When the push-button 53 is in the "on-backward" position, the abovementioned first terminal of the corresponding electric adjustment motor is connected to the power supply line 49, while the second terminal of this motor is connected to the power supply line 48.

The device which has just been described works as follows.

When the user of the seat wishes to adjust the position of this seat, he or she actuates the push-buttons 53 of the command box 40, which makes the electric adjustment motors 10, 20, 30 work, the relay 47 normally being closed.

When this user has reached a position which suits him or her, he or she may store the seat position in memory by pressing first of all the key 43 to tell the central unit 41 that it is to store the current seat position, and then one of the keys 44, 45, 46, for example the key 44, to tell the central unit in which register of the memory 42 the current seat position is to be stored: the central unit 41 then stores in this register the values transmitted to it by the various position sensors 11, 21, 31.

If it is now assumed that the seat has been displaced from this position stored in memory, the user can command the return of the seat to said memorized position by pressing the abovementioned key 44, which makes the central unit 41 start monitoring the electric polarity of the various terminals 12, 13, 22, 23, 32, 33 of the electric adjustment motors.

This monitoring may be performed for example approximately once every millisecond.

Thus, at each stage of this monitoring, when the user has actuated one of the push-buttons 53 to make one of the electric adjustment motors 10, 20, 30 turn in a given direction, the polarities of the terminals of the motors are identified by the central unit 41 which determines in this way whether or not the electric adjustment motor in question is going to turn in a direction which would bring it closer to the memorized position to which the seat is to return.

If the electric adjustment motor in question is electrically powered to turn in a direction which will indeed bring it closer to the memorized position to which the seat is to return, then the central unit 41 does not react, which means that the relay 47 remains closed and the motor in question can start.

In contrast, when the opposite is true, the central unit 41 commands the opening of the relay 47, thus preventing the electric adjustment motors from working for a predetermined duration, for example 1 ms or possibly up to 10 ms.

After this predetermined duration, the central unit 41 commands the closure of the relay 47, and checks again the polarity of the various electric adjustment motors.

If one of the electric adjustment motors is again electrically powered in such a way that this motor would lead to the seat being displaced in a way which would move it away from the memorized position, the central unit 41 again immediately commands the opening of the relay 47, which then does not allow the electric motor in question to start.

This monitoring by the central unit 41 continues as long as the seat has not reached the memorized position to which it is to return, or possibly as long as one of the memory command keys 44, 45, 46 remains activated, if these are keys which have two stable positions (go/stop), or possibly as long as a predetermined length of time has not elapsed since the activation of one of the memory command keys 44, 45, 46 if these are instantaneous-contact keys.

The invention which has just been described is not limited to the specific example which has just been described; on the contrary, it encompasses all alternative forms thereof, especially those in which the moving parts of the seat are commanded by hydraulic or pneumatic means rather than by electric motors, these hydraulic or pneumatic means then themselves being commanded by solenoid valves or the like connected to the central unit 41.

We claim:

1. A command device for a vehicle seat which has several moving parts, this device including:

electric adjustment members connected to a common electrical power supply through a power supply circuit for commanding the adjustment of at least some of the moving parts of the seat, known as the motorized parts, position sensors associated respectively with these various motorized parts, an electronic central unit which receives information from the various position sensors and which controls the operation of the adjustment members, this central unit furthermore being designed to be able to store some seat positions in memory, an adjustment command keypad including manual actuating members which allow the adjustment members to be commanded in order selectively to displace the motorized parts of the seat in two opposite directions, and a memory command keypad for commanding the memory storage of one seat position by the central unit and for commanding the return of the seat to a position previously stored in memory, wherein each actuating member of the adjustment command keypad comprises a power-on/power-off switch which is placed directly in the power supply circuit for enabling one of the adjustment members to be powered or not powered selectively from the common electrical power supply, all the power-on/power-off switches being connected to this common power supply by means of a single switching device commanded by the central unit, command reading devices being provided, each for detecting an actuation of one or said on/off switches tending to displace a motorized part of the seat in a given direction, these command reading devices being connected to the central unit, and wherein the central unit opens the switching device to thus prevent the seat from being displaced when the central unit detects an actuation of one of the power-on/power off switches which would tend to move the seat away from a position stored in the memory if the memory command keypad has been actuated to look for this memorized position, and the central unit closes said switching device to thereby enable the seat to be displaced when said central unit detects an actuation of one of the power on/power off switches which tends to move the seat towards said position stored in the memory if the memory command key pad has been actuated to look for this memorised position.

2. The device as claimed in claim 1, in which the command reading devices comprise voltage-detection devices connected downstream of the on/off switches, the central unit being designed to close the switching device again cyclically after each opening of this switching device in order thus to detect the actuation of the power-on/power-off switches, and this central unit also being designed to open this switching device in a time which is short enough to prevent any motorized displacement of the seat when it then detects an actuation of a power-on/power-off switch which would tend to move the seat away from the above-mentioned position stored in memory if the memory command keypad has been actuated to look for this memorized position.

3. The device as claimed in claim 2, in which the central unit is designed to open the relay at most 1 ms after actuation of one of the power-on/power-off switches which would tend to move the seat away from a position stored in memory if the memory command keypad has been actuated to look for this memorized position.

4. The device as claimed in claim 2, in which the central unit is designed to close the switching device again after a duration of less than 10 ms after having opened this switching device.

5. The device as claimed in claim 1, in which the electric adjustment members are electric motors, each for driving at least one moving part of the seat.

* * * * *